United States Patent
Tzung et al.

(10) Patent No.: US 11,334,187 B1
(45) Date of Patent: May 17, 2022

(54) DISPLAY AND TOUCH DRIVER SYSTEM

(71) Applicant: HIMAX TECHNOLOGIES LIMITED, Tainan (TW)

(72) Inventors: Yi Chen Tzung, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/216,700

(22) Filed: Mar. 30, 2021

(51) Int. Cl.
*G06F 3/041* (2006.01)

(52) U.S. Cl.
CPC ............ *G06F 3/04164* (2019.05); *G06F 2203/04102* (2013.01)

(58) Field of Classification Search
CPC ............ G06F 3/04164; G06F 2300/04102
USPC ........................................................ 345/156
See application file for complete search history.

(56) References Cited

U.S. PATENT DOCUMENTS

| | | | |
|---|---|---|---|
| 2005/0024300 A1* | 2/2005 | Abe .................... | G09G 3/3283 345/76 |
| 2014/0232691 A1* | 8/2014 | Lee .................... | G06F 3/0418 345/174 |
| 2018/0188867 A1* | 7/2018 | Yeh .................... | G06F 3/047 |
| 2020/0064880 A1* | 2/2020 | Roberson .......... | G06F 1/12 |

* cited by examiner

*Primary Examiner* — Mark Edwards
(74) *Attorney, Agent, or Firm* — JCIPRNET

(57) ABSTRACT

A display and touch driver system including a plurality of display and touch drivers and a wire circuit is provided. The plurality of display and touch drivers are connected in cascade. The plurality of display and touch drivers are configured to synchronously drive a display and touch panel to perform a touch sensing operation. Each of the display and touch drivers includes an operational amplifier. The operational amplifier includes a first stage and a second stage. An output node of the first stage is coupled to an input node of the second stage. The output nodes of the first stages of the operational amplifiers are connected together via the wire circuit.

8 Claims, 3 Drawing Sheets

DISPLAY AND TOUCH DRIVER SYSTEM

BACKGROUND

Technical Field

The invention relates to a driver system, more specifically, to a display and touch driver system.

Description of Related Art

For driving a large-size panel, a plurality of driver chips connected in series are required. The driver chips are connected via a connecting line and synchronized with one another according to a reference signal. The reference signal may be transmitted to the driver chips along a long connecting line, and thus the synchronization of the driver chips is inaccurate. In addition, the driver chips may connected in a wire-or manner, and thus an additional static current between the driver chips may be generated due to process variation.

SUMMARY

The invention is directed to a display and touch driver system, where an additional static current between drivers can be reduced.

An embodiment of the invention provides a display and touch driver system including a plurality of display and touch drivers and a wire circuit. The plurality of display and touch drivers are connected in cascade. The plurality of display and touch drivers are configured to synchronously drive a display and touch panel to perform a touch sensing operation. Each of the display and touch drivers includes an operational amplifier. The operational amplifier includes a first stage and a second stage. An output node of the first stage is coupled to an input node of the second stage. The output nodes of the first stages of the operational amplifiers are connected together via the wire circuit.

In an embodiment of the invention, the wire circuit includes at least one connecting line. The at least one connecting line is configured to connect the output nodes of the first stages of the operational amplifiers.

In an embodiment of the invention, the first stages of the operational amplifiers output differential signals to the respective second stages. The wire circuit includes a first connecting line and a second connecting line. The first connecting line and the second connecting line connect the output nodes of the first stages of the operational amplifiers.

In an embodiment of the invention, the plurality of display and touch drivers include a master display and touch driver and a plurality of slave display and touch drivers. The plurality of slave display and touch drivers are connected to the master display and touch driver. The master display and touch driver is configured to output a reference signal to the plurality of slave display and touch drivers to synchronize the touch sensing operation of the master display and touch driver and the plurality of slave display and touch drivers.

In an embodiment of the invention, each of the master display and touch driver and the plurality of slave display and touch drivers includes an input terminal and a first output terminal. The wire circuit includes a third connecting line and a fourth connecting line. The third connecting line is configured to connect the input terminals of the master display and touch driver and the plurality of slave display and touch drivers. The reference signal are transmitted on the third connecting line and inputted to the master display and touch driver and the plurality of slave display and touch drivers via the input terminals. The fourth connecting line is configured to connect the first output terminals of the master display and touch driver and the plurality of slave display and touch drivers. Driving signals are outputted from the first output terminals and transmitted on the fourth connecting line.

In an embodiment of the invention, the master display and touch driver further includes a signal generator and a second output terminal. The second output terminal is connected to the third connecting line. The signal generator is configured to generate and output the reference signal via the second output terminal.

In an embodiment of the invention, the plurality of display and touch drivers are implemented as different semiconductor chips. The different semiconductor chips are connected via a flexible printed circuit. The wire circuit is disposed on the flexible printed circuit.

In an embodiment of the invention, the plurality of display and touch drivers are further configured to synchronously drive the display and touch panel to perform a display operation.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure, and together with the description, serve to explain the principles of the disclosure.

DESCRIPTION OF THE EMBODIMENTS

Figure 1:
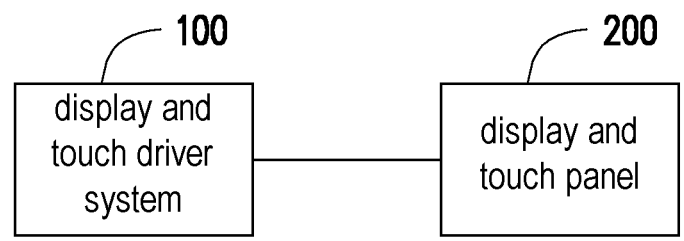
FIG. 1 is a block diagram illustrating a display and touch driver system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a display and touch driver system according to an embodiment of the invention. Referring to FIG. 1, a display and touch driver system 100 is connected a display and touch panel 200. The display and touch panel 200 includes display pixels and touch sensors (not shown in FIG. 1) to perform a display operation and a touch sensing operation. The display and touch driver system 100 is configured to control and drive the display and touch panel 200 to perform the display operation and the touch sensing operation.

Figure 2:
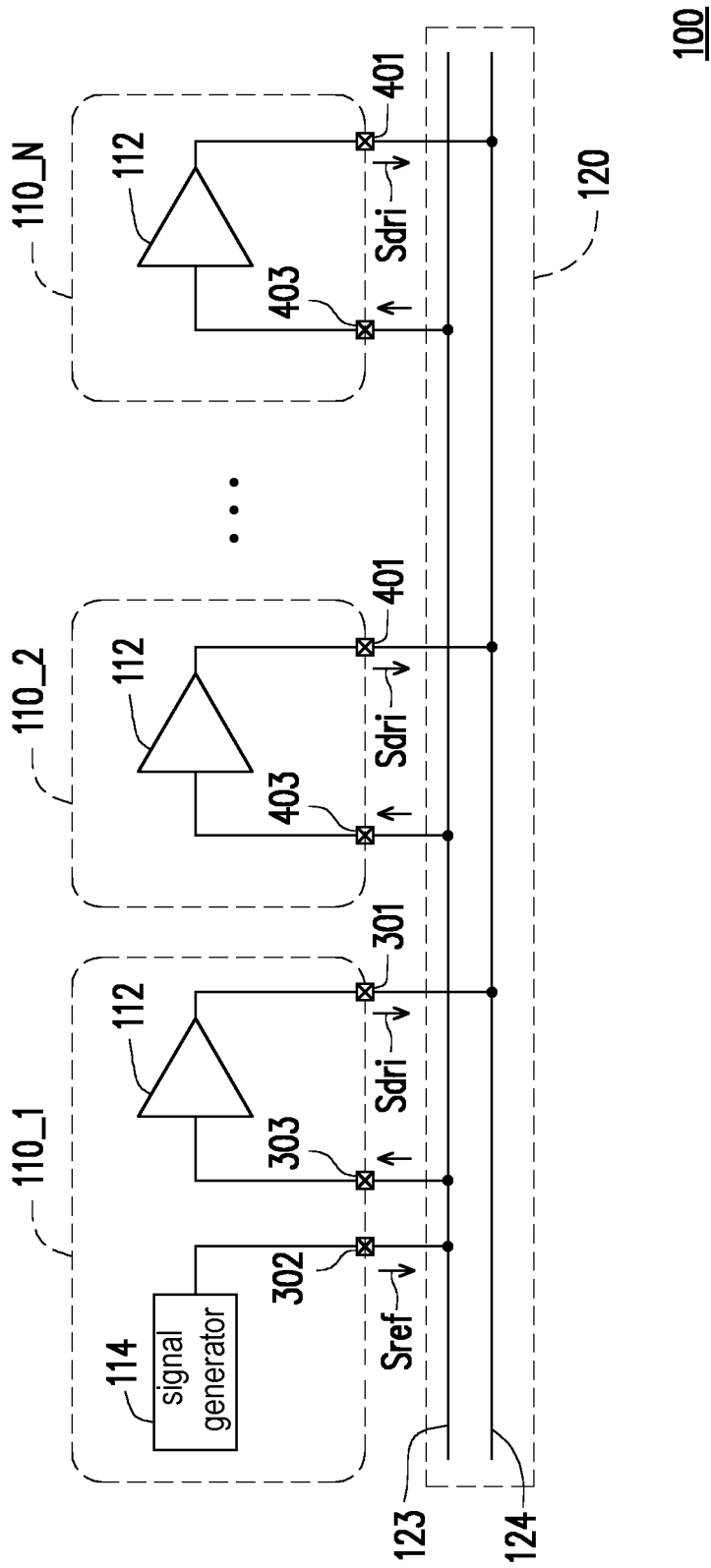
FIG. 2 is a circuit diagram illustrating the display and touch driver system of FIG. 1 according to an embodiment of the invention.

FIG. 2 is a circuit diagram illustrating the display and touch driver system of FIG. 1 according to an embodiment of the invention. Referring to FIG. 1 and FIG. 2, the display and touch driver system 100 includes a plurality of display and touch drivers 110_1, 110_2 to 110_N and a wire circuit 120, where N is a natural number larger than 2. The number of the display and touch drivers does not intend to limit the invention.

The display and touch drivers 110_1, 110_2 to 110_N are connected in cascade and connected with one another via the wire circuit 120. The display and touch drivers 110_1, 110_2 to 110_N are configured to synchronously drive the display and touch panel 200 to perform the display operation and the touch sensing operation according to a reference signal Sref. For example, each of the display and touch drivers 110_1, 110_2 to 110_N may include an operational amplifier 112. The operational amplifiers 112 output driving signals Sdri to drive the display and touch panel 200. The display and touch driver 110_1 is configured to generate and output the reference signal Sref to the display and touch drivers 110_2 to 110_N to synchronize the display operation and the touch sensing operation of the display and touch drivers 110_1, 110_2 to 110_N.

To be specific, the display and touch drivers 110_1, 110_2 to 110_N include the master display and touch driver 110_1 and the plurality of slave display and touch drivers 110_2 to 110_N. The slave display and touch drivers 110_2 to 110_N are connected to the master display and touch driver 110_1. The master display and touch driver 110_1 further includes a signal generator 114. The signal generator 114 generates and outputs the reference signal Sref. The signal generator 114 outputs the reference signal Sref to the master display and touch driver 110_1 and the slave display and touch drivers 110_2 to 110_N to synchronize the display operation and the touch sensing operation of the master display and touch driver 110_1 and the slave display and touch drivers 110_2 to 110_N.

The master display and touch driver 110_1 includes a first output terminal 301, a second output terminal 302 and an input terminal 303. Each of the slave display and touch drivers 110_2 to 110_N includes a first output terminal 401 and an input terminal 403. The wire circuit 120 includes a third connecting line 123 and a fourth connecting line 124.

The third connecting line 123 connects the second output terminal 302 and the input terminal 303 of the master display and touch driver 110_1 and the input terminals 403 of the slave display and touch drivers 110_2 to 110_N. The signal generator 114 outputs the reference signal Sref via the second output terminal 302. The reference signal Sref are transmitted on the third connecting line 123 and inputted to the master display and touch driver 110_1 and the slave display and touch drivers 110_2 to 110_N via the input terminals 303 and 403.

The fourth connecting line 124 connects the first output terminal 301 of the master display and touch driver 110_1 and the first output terminals 401 of the slave display and touch drivers 110_2 to 110_N. The operational amplifiers 112 output the driving signals Sdri via the first output terminals 301 and 401. The driving signals Sdri are outputted from the first output terminals 301 and 401 and transmitted on the fourth connecting line 124.

In an embodiment, the display and touch drivers 110_1, 110_2 to 110_N may be implemented as different semiconductor chips, and the different semiconductor chips are connected via a flexible printed circuit (FPC). The wire circuit 120 is disposed on the flexible printed circuit. The output terminals and the input terminals of the display and touch drivers 110_1, 110_2 to 110_N may be pins of the semiconductor chips.

Figure 3:
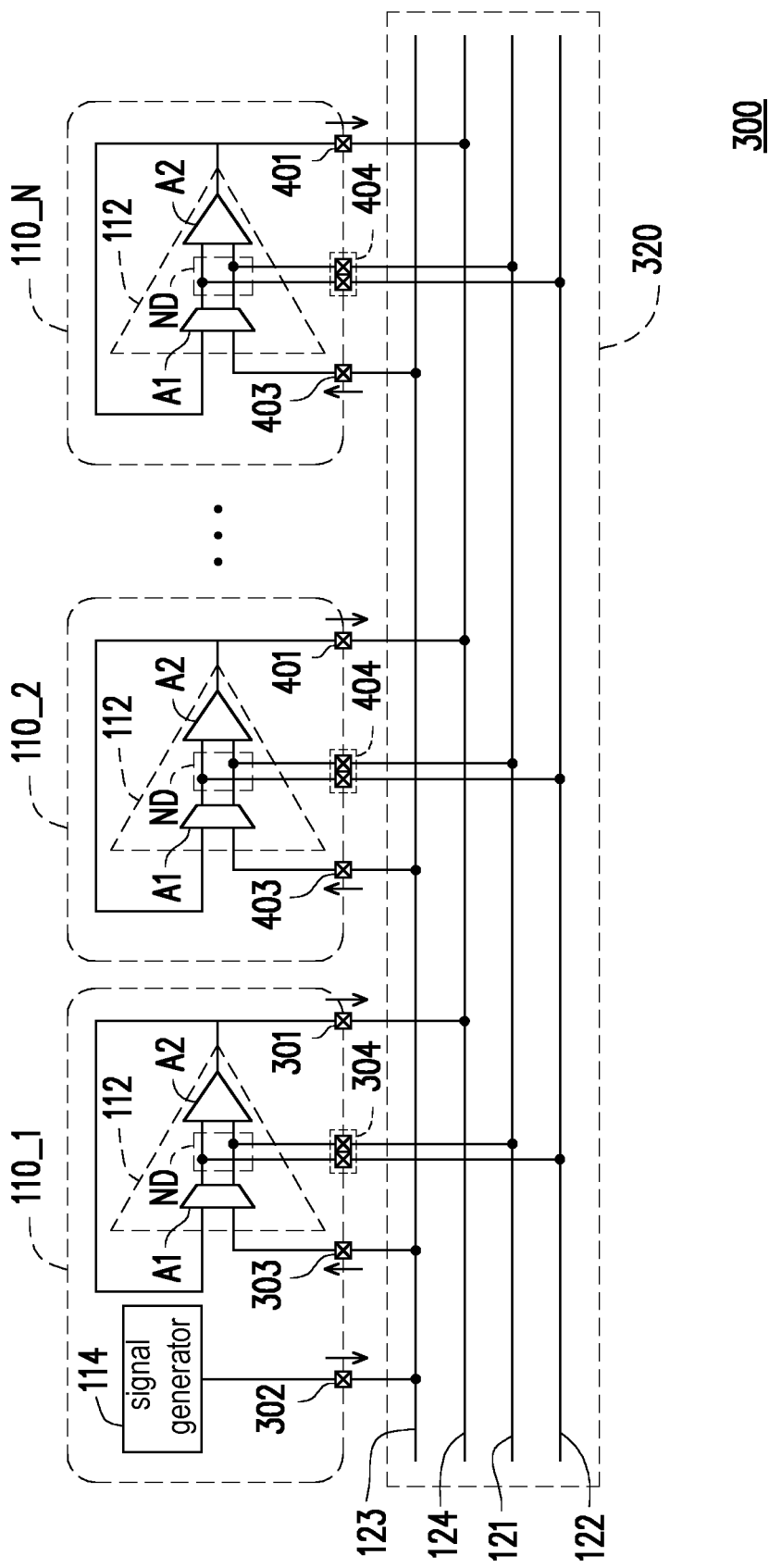
FIG. 3 is a circuit diagram illustrating the display and touch driver system of FIG. 1 according to another embodiment of the invention.

FIG. 3 is a circuit diagram illustrating the display and touch driver system of FIG. 1 according to another embodiment of the invention. Referring to FIG. 1 and FIG. 3, the display and touch driver system 300 of the present embodiment is similar to the display and touch driver system 100 of FIG. 2, and the main difference, for example, lies in that the wire circuit 320 further includes at least one connecting line 121 or 122 to connect output nodes ND of first stages A1 of the operational amplifiers 112. The output nodes ND of the first stages A1 of the operational amplifiers 112 are connected together via the wire circuit 120.

To be specific, the operational amplifier 112 includes a first stage A1 and a second stage A2. The output node ND of the first stage A1 is coupled to an input node ND of the second stage A2. The first stage A1 of the operational amplifier 112 outputs differential signals to the second stage A2. The wire circuit 120 further includes a first connecting line 121 and a second connecting line 122. The first connecting line 121 and the second connecting line 122 connect the output nodes ND of the first stages A1 of the operational amplifiers 112 via connecting terminals 304 and 404. The connecting terminals 304 and 404 may be pins of the semiconductor chips.

In summary, in the embodiments of the invention, the wire circuit connects the display and touch drivers. The master display and touch driver transmits, via the wire circuit, the reference signal to the slave display and touch drivers to synchronize the display operation and the touch sensing operation of the display and touch drivers. In addition, the output nodes of the first stages of the operational amplifiers are connected to one another via the wire circuit. Therefore, an additional static current between the display and touch drivers can be reduced and the synchronization of the display and touch drivers is more accurate.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display and touch driver system, comprising:
a plurality of display and touch drivers, connected in cascade and configured to synchronously drive a display and touch panel to perform a touch sensing operation, wherein each of the display and touch drivers comprises an operational amplifier, the operational amplifier comprises a first stage and a second stage, an output node of the first stage is coupled to an input node of the second stage; and
a wire circuit, wherein the output nodes of the first stages of the operational amplifiers are connected together via the wire circuit.

2. The display and touch driver system of claim 1, wherein the wire circuit comprises at least one connecting line configured to connect the output nodes of the first stages of the operational amplifiers.

3. The display and touch driver system of claim 2, wherein the first stages of the operational amplifiers output differential signals to the respective second stages, and the wire circuit comprises a first connecting line and a second connecting line, wherein the first connecting line and the second connecting line connect the output nodes of the first stages of the operational amplifiers.

4. The display and touch driver system of claim 1, wherein the plurality of display and touch drivers comprise:
a master display and touch driver; and
a plurality of slave display and touch drivers, connected to the master display and touch driver, wherein the master display and touch driver is configured to output a reference signal to the plurality of slave display and touch drivers to synchronize the touch sensing operation of the master display and touch driver and the plurality of slave display and touch drivers.

5. The display and touch driver system of claim 1, wherein each of the master display and touch driver and the plurality of slave display and touch drivers comprises an input terminal and a first output terminal, wherein the wire circuit comprises:
- a third connecting line, configured to connect the input terminals of the master display and touch driver and the plurality of slave display and touch drivers, wherein the reference signal are transmitted on the third connecting line and inputted to the master display and touch driver and the plurality of slave display and touch drivers via the input terminals; and
- a fourth connecting line, configured to connect the first output terminals of the master display and touch driver and the plurality of slave display and touch drivers, wherein driving signals are outputted from the first output terminals and transmitted on the fourth connecting line.

6. The display and touch driver system of claim 5, wherein the master display and touch driver further comprises a signal generator and a second output terminal, the second output terminal is connected to the third connecting line, and the signal generator is configured to generate and output the reference signal via the second output terminal.

7. The display and touch driver system of claim 1, wherein the plurality of display and touch drivers are implemented as different semiconductor chips, the different semiconductor chips are connected via a flexible printed circuit, and the wire circuit is disposed on the flexible printed circuit.

8. The display and touch driver system of claim 1, wherein the plurality of display and touch drivers are further configured to synchronously drive the display and touch panel to perform a display operation.

* * * * *